United States Patent
Zheng et al.

(10) Patent No.: US 10,319,996 B2
(45) Date of Patent: Jun. 11, 2019

(54) CATHODE MATERIAL FOR LITHIUM ION SECONDARY BATTERY, METHOD OF PRODUCING THE SAME, AND LITHIUM ION SECONDARY BATTERY

(71) Applicant: Microvast Power Systems Co., LTD., Huzhou, Zhejiang Province (CN)

(72) Inventors: Zhuoqun Zheng, Huzhou (CN); Jian Qiu, Huzhou (CN); Xiaozhen Zhao, Huzhou (CN); Yunhua Nie, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 433 days.

(21) Appl. No.: 14/815,944

(22) Filed: Jul. 31, 2015

(65) Prior Publication Data

US 2016/0049645 A1 Feb. 18, 2016

(30) Foreign Application Priority Data

Aug. 13, 2014 (CN) .......................... 2014 1 0398295

(51) Int. Cl.
*H01M 4/36* (2006.01)
*H01M 4/485* (2010.01)
*H01M 4/505* (2010.01)
*H01M 4/525* (2010.01)
*H01M 4/131* (2010.01)
*H01M 4/48* (2010.01)
*H01M 4/1391* (2010.01)

(52) U.S. Cl.
CPC .......... *H01M 4/366* (2013.01); *H01M 4/131* (2013.01); *H01M 4/1391* (2013.01); *H01M 4/48* (2013.01); *H01M 4/505* (2013.01); *H01M 4/525* (2013.01)

(58) Field of Classification Search
CPC combination set(s) only.
See application file for complete search history.

(56) References Cited

U.S. PATENT DOCUMENTS

| 8,926,860 B2 | 1/2015 | Sun et al. | |
|---|---|---|---|
| 2008/0160410 A1 | 7/2008 | Sun et al. | |
| 2011/0076556 A1* | 3/2011 | Karthikeyan | H01M 4/366 429/188 |
| 2014/0087065 A1* | 3/2014 | Li | H01M 4/0402 427/126.3 |
| 2014/0131616 A1 | 5/2014 | Sun et al. | |
| 2014/0162127 A1* | 6/2014 | Kim | H01M 4/366 429/224 |

FOREIGN PATENT DOCUMENTS

| CN | 102394295 A | 3/2012 |
|---|---|---|
| CN | 102723480 A | 10/2012 |
| CN | 103326016 A | 9/2013 |
| KR | 10-2006-0035547 A | 4/2006 |

OTHER PUBLICATIONS

Liu et al., "Preparation and Doping Mode of Doped LiMn2O4 for Li-Ion Batteries", Energies 2013, 6, 1718-1730.*

* cited by examiner

*Primary Examiner* — Ladan Mohaddes
(74) *Attorney, Agent, or Firm* — Cheng-Ju Chiang (57) ABSTRACT

The present invention discloses a cathode material for lithium ion secondary battery. The cathode material is in the form of powder particles. The powder particle includes a bulk portion and a coating portion coated on the outer surface of the bulk portion. The bulk portion is formed of at least one first cathode material which is a lithium-nickel based composite oxide. The first cathode material has electrochemical activity and has high charging-discharging specific capacity at a charged voltage of 4.2V versus Li/Li$^+$. The coating portion is formed of at least one second cathode material. The second cathode material has no electrochemical activity or has low charging-discharging specific capacity at a charged voltage of 4.2V versus Li/Li$^+$. Lithium ion secondary battery using the cathode material has high energy density, cycling stability, security, and output power.

10 Claims, 2 Drawing Sheets

CATHODE MATERIAL FOR LITHIUM ION SECONDARY BATTERY, METHOD OF PRODUCING THE SAME, AND LITHIUM ION SECONDARY BATTERY

CROSS REFERENCE TO RELATED APPLICATION

The present application is based on and claims priority of Chinese Patent Application No. 201410398295.2, filed on Aug. 13, 2014. The entire disclosure of the above-identified application, including the specification, drawings and claims are incorporated herein by reference in its entirety.

FIELD OF THE INVENTION

The present invention relates to lithium ion secondary batteries, and more particularly to a cathode material for lithium ion secondary battery, a method of producing the cathode material, and a lithium ion secondary battery using the cathode material.

BACKGROUND OF THE INVENTION

Currently, the cathode materials for lithium ion secondary batteries are mainly lithium transition metal oxides, including hexagonal layered structure materials such as $LiCoO_2$, $LiNiO_2$, $LiNi_{1-x-y}Co_xMn_yO_2$ and spinel structure materials such as $LiMn_2O_4$. The cathode materials also include polyanion cathode materials such as $LiFePO_4$ with olivine structure. Since the crystal structure of $LiNiO_2$ and $LiCoO_2$ is the same, the theoretical specific capacity would be the same. However, the actual specific capacity of $LiNiO_2$ is larger than 200 mAh/g, which is much higher than that of $LiCoO_2$. In fact, the reserve of nickel (Ni) is higher than cobalt (Co), the price of nickel is lower than cobalt, and the toxicity of nickel is lower than cobalt. Therefore, $LiNiO_2$ is expected to replace $LiCoO_2$ as a preferred cathode material for lithium ion secondary battery.

However, due to the difficulty in producing $LiNiO_2$ and the poor cycling stability and thermal stability of $LiNiO_2$, $LiNiO_2$ has got few commercial applications. When elements such as Co and Al are doped into $LiNiO_2$, these elements can stabilize the crystal structure of $LiNiO_2$, thereby improving the cycling performance and the thermal stability of $LiNiO_2$, reducing the difficulty of producing, and promoting the transition from $Ni^{2+}$ to $Ni^{3+}$ in a sintering process. Compared to $LiNiO_2$, Al- and Co-doped $LiNiO_2$ ($Li_{1+\delta}[Ni_{1-x-y}Co_xAl_y]O_2$) can significantly improve the performance of the cathode material while maintaining a high capacity. The doped $LiNiO_2$ can be industrially produced in large-scale and is successfully applied as digital power supply and electric vehicle power supply.

Compared to $LiNi_{1-x-y}Co_xMn_yO_2$ and $LiFePO_4$, the cycling stability and thermal stability of the doped $Li_{1+\delta}[Ni_{1-x-y}Co_xAl_y]O_2$ still requires improvement. When the battery using the cathode material of $Li_{1+\delta}[Ni_{1-x-y}Co_xAl_y]O_2$ is charged, $Ni^{4+}$ with high valence and high reactivity will be generated. $Ni^{4+}$ will react with the electrolyte to generate gas and form an organic polymer on the surface of the cathode material. However, the organic polymer is an electrical insulator and is non-conductive for lithium ions, thereby causing flatulence of the battery and rise of an inner resistance in the positive electrode of the battery. At high temperature, the reaction between $Ni^{4+}$ and the electrolyte will increase, producing more gas and more organic polymer on the surface of the cathode material. Thus, the surface of the cathode material is deposited continuously with nickel monoxide, which is an insulator with no electrochemical activity, thereby causing the inner resistance in the positive electrode to rise further. Meanwhile, $Ni^{4+}$ is continuously reduced to $Ni^{2+}$, causing the reversible capacity of the battery to lose gradually, eventually leading the battery life to an end in a short time. Moreover, due to high reactivity of $Ni^{4+}$ and the oxygen evolution at high temperature, the battery will probably reach an out-of-control state at a relatively low temperature, causing a security risk in use of the battery.

Surface coating is one of important means to modify and improve the electrochemical properties of the cathode material. Coating materials commonly used are ZnO, $ZrO_2$, $AlPO_4$, $Li_3PO_4$, $Al_2O_3$, $AlF_3$, $SiO_2$, $TiO_2$, MgO and $Li_2O$-$2B_2O_3$, as well as organic polymer such as polyaniline. Although the modification mechanism is still not fully understood, many studies have shown that a number of coating materials can improve the performance of the cathode material more or less, especially the cycle life and the thermal stability of the cathode material. The modification mechanism may be that the coating material works in two aspects. One aspect is the physical isolation, although the coating material cannot cover all the surface of the particle, the coating material can, to a certain extent, reduce the contact between the cathode material and the electrolyte. Another aspect is the reaction with the decomposition product of Lewis acid of the electrolyte, this will reduce the acidity of the interface between the cathode material and the electrolyte to protect the positive electrode. However, the conduction capability of the coating material for conducting lithium ions or electrons is often not ideal, and at least the diffusion coefficient for lithium ions and the conductivity for electrons are lower than the active cathode material. Thus, the coating material on the surface of the cathode material, particularly when coated with an excessive amount, will inevitably cause decline of the rate performance of the cathode material.

Korean patent application No. 1020040118280 and US patent application publication No. 20080160410A1 disclose a core-shell structure in particles to stabilize the nickel-rich cathode material. The core of the particle is formed of a nickel-rich material having high capacity, such as, $LiNi_{0.8}Co_{0.2}O_2$ or $LiNi_{0.8}Co_{0.1}Mn_{0.1}O_2$. The shell of the particle is formed of a material having good thermal stability and long cycling life, such as, $LiNi_{0.5}Mn_{0.5}O_2$. The core provides the high capacity for the cathode material. The shell has a stabilized structure and is not reactive with the electrolyte. The shell provides a physical isolation of the core from the electrolyte and serves as a protection layer for preventing the reaction of the core with the electrolyte, thereby retaining high capacity as well as good thermal stability and long cycling life for the cathode material.

U.S. Pat. No. 8,926,860 and US patent application publication No. 20140131616A1 disclose a cathode material with concentration gradient in whole particle. The metal making up the cathode material has continuous concentration gradient in the entire region, from the center part to the surface part of the particle. For example, the high active metal such as Ni has a highest concentration in the center part and a lowest concentration in the surface part, i.e., the concentration of Ni is gradually decreased from the center part to the surface part. On the contrary, the inactive metal such as Mn has a lowest concentration in the center part and a highest concentration in the surface part, i.e., the concentration of Mn is gradually increased from the center part to the surface part. Other materials such as Co can be distributed uniformly in the particle, or otherwise distributed with continuous concentration gradient throughout the particle. The nickel-rich center part of the particle causes the cathode material having high capacity performance, while the manganese-rich surface part of the particle causes the cathode material having good thermal stability and long cycling life.

From the above core-shell structure or concentration gradient structure of the particles used to form the cathode material, the core idea is using the stable coating material in the surface part to protect the inner active material in the center part, to thereby obtain nickel-rich cathode material having high capacity, good thermal stability and long cycling life. The coating material in the surface part is preferred to be conductive to lithium ions or electrons, to avoid a decrease of capacity, a rise of inner resistance and an influence of rate performance to the cathode material. However, the coating material in the surface part for protection purpose is electrochemically active. The coating material has relatively high charging-discharging specific capacity at a voltage of 4.2V versus Li/Li$^+$. That is, when the battery cell is charged to 4.2V, active elements in the coating material such as Ni, Co, Mn will be oxidized as lithium ions deintercalate. As a result, the surface of the coating material will form active sites, which are electrochemically active. Thus, using outer relatively stable material to protect inner active material still cannot avoid the coating material from reacting with the electrolyte. Furthermore, due to structural difference, the expansions of the outer coating material and the inner core material during charging and discharging are also different. Especially for the core-shell structure, after charging and discharging in repeated times, the shell will separate from the core, thereby causing an interruption of a conduction path inside the particle for conducting lithium ions or electrons.

SUMMARY OF THE INVENTION

In order to solve the above-mentioned problems, the present invention provides a cathode material for lithium ion secondary battery, a method of producing the cathode material, and a lithium ion secondary battery using the cathode material. The nickel-rich cathode material according to this invention has good thermal stability and excellent charging-discharging cycle while retaining high capacity. The nickel-rich cathode material has high charging-discharging rate and can meet the requirements for batteries as power supply. The method of producing the cathode material is relatively simple, controllable, cost-effective, and suitable for industrial production. The lithium ion secondary battery using the cathode material has characteristics of high energy density, cycling stability, security, and output power.

The present invention provides a cathode material for lithium ion secondary battery. The cathode material is in the form of powder particles. The powder particle includes a bulk portion and a coating portion coated on the outer surface of the bulk portion. The bulk portion is formed of at least one first cathode material which is a lithium-nickel based composite oxide. The first cathode material has electrochemical activity and has high charging-discharging specific capacity at a charged voltage of 4.2V versus Li/Li$^+$. The coating portion is formed of at least one second cathode material. The second cathode material has no electrochemical activity or has low charging-discharging specific capacity at a charged voltage of 4.2V versus Li/Li$^+$.

The present invention uses the coating portion to protect the bulk portion of the cathode material, to thereby obtain the cathode material with high capacity, good thermal stability and long cycling life. The first cathode material of the bulk portion has electrochemical activity and high charging-discharging specific capacity at a charged voltage of 4.2V versus Li/Li$^+$. The second cathode material of the coating portion has no electrochemical activity or low charging-discharging specific capacity at a charged voltage of 4.2V versus Li/Li$^+$. In the present invention, the first cathode material of the bulk portion has high charging-discharging specific capacity means that the first cathode material has a charging-discharging specific capacity of greater than 160 mAh/g, preferably greater than 180 mAh/g, the second cathode material of the coating portion has low charging-discharging specific capacity means that the second cathode material has a charging-discharging specific capacity of lower than 50 mAh/g.

The second cathode material, which has no electrochemical activity or low charging-discharging specific capacity when the charged voltage (versus Li/Li$^+$) is 4.2V, can have many choices. For example, $Li_2MnO_3$ is one of the choices. $Li_2MnO_3$ is regarded as no electrochemical activity when the charged voltage is 4.2V (generally, when the charged voltage is greater than 4.5V, $Li_2O$ will deintercalate from $Li_2MnO_3$ to cause $Li_2MnO_3$ to exhibit electrochemical activity). Another choice for the second cathode material is $LiNi_{0.5}Mn_{1.5}O_4$. When the charged voltage reaches to 4.9V, the discharging specific capacity of $LiNi_{0.5}Mn_{1.5}O_4$ can reach up to more than 120 mAh/g. However, when the charged voltage is 4.2V, there is almost no discharging specific capacity versus Li/Li$^+$ or the discharging specific capacity is very low. The second cathode material can further be high voltage cathode materials such as $LiNiPO_4$ or $LiCoPO_4$. These materials can be used for coating the outer surface of the bulk portion of the powder particle, since these materials have the common feature that they have no electrochemical activity or low discharging specific capacity versus Li/Li$^+$ when the charged voltage is 4.2V. As a result, the second cathode material coated on the bulk portion has no contribution to the discharging specific capacity of the cathode material. Meanwhile, these materials used for coating the bulk portion have conduction channels for lithium ions or electrons and have a potential electrochemical activity. Therefore, these materials can act as active materials under certain conditions to avoid drawbacks of conventional coating materials, for example, blocking the migration of lithium ions, causing decline of conductivity to electrons. Furthermore, since these materials used for coating on and protecting the bulk portion have no electrochemical activity or low discharging specific capacity, the outer surface of the cathode material is always in an inactive state during the course of charging and discharging, such that active sites which are electrochemically active will not occur on the outer surface of the cathode material, thereby preventing the outer surface of the cathode material from reacting with the electrolyte, because the inner first cathode material providing high capacity is physically isolated from the electrolyte by the outer second cathode material which is coated on the bulk portion and has no electrochemical activity or low charging-discharging specific capacity.

The second cathode material of the coating portion is preferably at least one of lithium transition metal composite oxides, because the lithium transition composite metal oxide has similar composition and structure to the lithium-nickel based composite oxide of the first cathode material of the bulk portion. During the producing of the cathode material, the second cathode material can be uniformly and evenly coated on the whole surface of the bulk portion by controlling process conditions of the method of the present invention. The second cathode materials such as $Al_2O_3$, $AlF_3$, $AlPO_4$ as conventionally used cannot be evenly coated on the bulk portion, thereby failing to effectively isolate the first cathode material of the cathode material from the electrolyte.

In the present invention, the powder particle of the cathode material has a bulk portion formed of a lithium-nickel based composite oxide. The lithium-nickel based composite oxide has electrochemical activity and high charging-discharging specific capacity when the charged voltage is 4.2V versus $Li/Li^+$. The bulk portion is coated with a second cathode material to form a coating portion on the bulk portion, and the second cathode material has no electrochemical activity or low charging-discharging specific capacity when the charged voltage is 4.2V versus $Li/Li^+$.

In the present invention, the powder particle having the bulk portion and the coating portion is different from the traditional core-shell structure. The traditional core-shell structure has a clear boundary between the core and the shell, and the shell has a large thickness, which is prone to occurring core-shell separation. However, in the present invention, the bulk portion accounts for the vast majority of the powder particle, and the thickness of the coating portion is much thinner than the shell of the traditional core-shell structure. In addition, the bonding strength between the bulk portion and the coating portion is also stronger than the traditional core-shell structure.

In an embodiment, the second cathode material is at least one lithium transition metal oxide, and the second cathode material has no electrochemical activity or low charging-discharging specific capacity at a charged voltage of 4.2V versus $Li/Li^+$.

In an embodiment, the lithium-nickel based composite oxide of the first cathode material has a general formula of $Li_{1+\delta}[Ni_{1-x-y}Co_xM_y]O_2$, wherein M is selected at least one metal element from Mn, Na, K, Mg, Ca, Sr, Ba, Al, Ga, In, Ge, Sn, Ti, V, Cr, Fe, Cu, Zn, Y, Zr, Nb, Mo, Cd, W, La, Ce, Nd and Sm, and wherein $0\leq\delta\leq0.2$, $0\leq x\leq0.5$, $0\leq x+y\leq0.5$.

In an embodiment, in the first cathode material with the general formula of $Li_{1+\delta}[Ni_{1-x-y}Co_xM_y]O_2$, the valence of the metal element Ni and Co is +3, the valence of the metal element M is +2, +3, +4, +5, or +6.

In an embodiment, the lithium-nickel based composite oxide of the first cathode material has a general formula of $Li_{1+\delta}[Ni_{1-x-y}Co_xM_y]O_{2-\alpha}P_\alpha$, wherein M is selected at least one metal element from Mn, Na, K, Mg, Ca, Sr, Ba, Al, Ga, In, Ge, Sn, Ti, V, Cr, Fe, Cu, Zn, Y, Zr, Nb, Mo, Cd, W, La, Ce, Nd and Sm, P represents F or S, and wherein $0\leq\delta\leq0.2$, $0\leq x\leq0.5$, $0\leq x+y\leq0.5$, $0\leq\alpha\leq0.2$.

In an embodiment, in the first cathode material with the general formula of $Li_{1+\delta}[Ni_{1-x-y}Co_xM_y]O_{2-\alpha}P_\alpha$, the valence of the metal element Ni and Co is +3, the valence of the metal element M is +2, +3, +4, +5, or +6.

In an embodiment, the second cathode material has a general formula of $Li_{1+\eta}[Mn_{2-a}M'_a]O_4$, wherein M' is selected at least one metal element from Ni, Co, Na, K, Mg, Ca, Sr, Ba, Al, Ga, In, Ge, Sn, Ti, V, Cr, Fe, Cu, Zn, Y, Zr, Nb, Mo, Cd, W, La, Ce, Nd and Sm, and wherein $0\leq\eta\leq0.2$, $0<a\leq1$. Or alternatively, the second cathode material has a general formula of $Li_{2+\gamma}[Mn_{2-b}M'_b]O_3$, wherein M' is selected at least one metal element from Ni, Co, Na, K, Mg, Ca, Sr, Ba, Al, Ga, In, Ge, Sn, Ti, V, Cr, Fe, Cu, Zn, Y, Zr, Nb, Mo, Cd, W, La, Ce, Nd and Sm, and wherein $0\leq\gamma\leq0.4$, $0\leq b\leq1$.

In an embodiment, in the second cathode material with the general formula of $Li_{1+\eta}[Mn_{2-a}M'_a]O_4$ and the general formula of $Li_{2+\gamma}[Mn_{2-b}M'_b]O_3$, the valence of the metal element of Mn is +4, the valence of the metal element of M' is +2, +3, +4, +5, or +6.

In an embodiment, the second cathode material has a general formula of $Li_{1+\eta}[Mn_{2-a}M'_a]O_{4-m}P_m$, wherein M' is selected at least one metal element from Ni, Co, Na, K, Mg, Ca, Sr, Ba, Al, Ga, In, Ge, Sn, Ti, V, Cr, Fe, Cu, Zn, Y, Zr, Nb, Mo, Cd, W, La, Ce, Nd and Sm, P represents F or S, and wherein $0\leq\eta\leq0.2$, $0<a\leq1$, $0<m\leq0.5$. Or alternatively, the second cathode material has a general formula of $Li_{2+\gamma}[Mn_{2-b}M'_b]O_{3-n}P_n$, wherein M' is selected at least one metal element from Ni, Co, Na, K, Mg, Ca, Sr, Ba, Al, Ga, In, Ge, Sn, Ti, V, Cr, Fe, Cu, Zn, Y, Zr, Nb, Mo, Cd, W, La, Ce, Nd and Sm, P represents F or S, and wherein $0\leq\gamma\leq0.4$, $0\leq b\leq1$, $0<n\leq0.5$.

In an embodiment, in the second cathode material with the general formula of $Li_{1+\eta}[Mn_{2-a}M'_a]O_{4-m}P_m$ and the general formula of $Li_{2+\gamma}[Mn_{2-b}M'_b]O_{3-n}P_n$, the valence of the metal element Mn is +4, the valence of the metal element of M' is +2, +3, +4, +5, or +6.

Multiple studies have shown that doping with non-metal elements such as F or S can improve the thermal stability and cycling stability of the cathode material. Therefore, the first cathode material of the bulk portion doped with F or S may have the general formula of $Li_{1+\delta}[Ni_{1-x-y}Co_xM_y]O_{2-\alpha}P_\alpha$, wherein M is selected at least one metal element from Mn, Na, K, Mg, Ca, Sr, Ba, Al, Ga, In, Ge, Sn, Ti, V, Cr, Fe, Cu, Zn, Y, Zr, Nb, Mo, Cd, W, La, Ce, Nd and Sm, P represents F or S, $0\leq\delta\leq0.2$, $0\leq x\leq0.5$, $0\leq x+y\leq0.5$, $0<\alpha\leq0.2$. The second cathode material of the coating portion doped with F or S may have the general formula of $Li_{1+\eta}[Mn_{2-a}M'_a]O_{4-m}P_m$, wherein M' is selected at least one metal element from Ni, Co, Na, K, Mg, Ca, Sr, Ba, Al, Ga, In, Ge, Sn, Ti, V, Cr, Fe, Cu, Zn, Y, Zr, Nb, Mo, Cd, W, La, Ce, Nd and Sm, P represents F or S, $0\leq\eta\leq0.2$, $0\leq a\leq1$, $0\leq m\leq0.5$. Or alternatively, the second cathode material of the coating portion doped with F or S may have the general formula of $Li_{2+\gamma}[Mn_{2-b}M'_b]O_{3-n}P_n$, wherein M' is selected at least on metal element from Ni, Co, Na, K, Mg, Ca, Sr, Ba, Al, Ga, In, Ge, Sn, Ti, V, Cr, Fe, Cu, Zn, Y, Zr, Nb, Mo, Cd, W, La, Ce, Nd and Sm, P represents F or S, $0\leq\gamma\leq0.4$, $0\leq b\leq1$, $0<n\leq0.5$. Generally, the doping amount of F or S is controlled to 5% (mole ratio) of the amount of the oxygen (O). If the doping amount is too small, improvement to the performance of the cathode material is not obvious. If the doping amount is too much, it will reduce the electron conduction of the cathode material, and even inhibit the capacity of the cathode material.

The first cathode material of the bulk portion has the general formula of $Li_{1+\delta}[Ni_{1-x-y}Co_xM_y]O_2$ or $Li_{1+\delta}[Ni_{1-x-y}Co_xM_y]O_{2-\alpha}P_\alpha$, wherein the metal element Ni has electrochemical activity, the valence of Ni is +3, and the valence of Ni transforms from +3 to +4 in the course of charging and discharging. In the course of charging, Li ions deintercalate from the positive electrode of the battery and intercalate into the negative electrode of the battery. In the course of discharging, Li ions deintercalate from the negative electrode of the battery and intercalate into the positive electrode of the battery. The valence the element Co is +3, the main role of Co is to form isomorphism solid solution with $LiNiO_2$ to stabilize the lattice structure of $LiNiO_2$, to promote the transition from $Ni^{2+}$ to $Ni^{3+}$ in a sintering process to form an ordered layer structure. The valence of other doped element M can be +2, +3, +4, +5, or +6, without particular limits.

The second cathode material of the coating portion has the general formula of $Li_{1+\eta}[Mn_{2-a}M'_a]O_4$, $Li_{2+\gamma}[Mn_{2-b}M'_b]$ $O_3$, $Li_{1+\eta}[Mn_{2-a}M'_a]O_{4-m}P_m$, or $Li_{2+\gamma}[Mn_{2-b}M'_b]O_{3-n}P_n$, wherein the valence of the main metal element Mn is +4. $Mn^{4+}$ is generally considered as a metal ion with no electrochemical activity. The valence of other doped element M' can be +2, +3, +4, +5, or +6, without particular limits.

In an embodiment, the weight the coating portion accounts for 0.1~10% of the weight of the powder particle.

In an embodiment, an outer surface of the coating portion is further coated with at least one Lewis base in order to remove HF at the interface between the cathode material and the electrolyte.

In an embodiment, the Lewis base is selected from at least one of $ZnO$, $Al_2O_3$, $MgO$, $CaO$, $ZrO_2$, $TiO_2$, $SnO_2$ and $Sb_2O_5$. The Lewis base acts as HF phagocytic agent to reduce acid at the interface between the cathode material and the electrolyte, to thereby protect the cathode material from corrosion.

In an embodiment, the weight of the Lewis base accounts for 0.1~5% of the weight of the powder particle.

In an embodiment, the powder particle is spherical or spheroidal, the particle diameter is 0.5~50 μm.

The cathode material in this invention is in the form of powder particles, and the powder particle is spherical or spheroidal. The particle diameter is 0.5~50 μm, preferably 1~30 μm. The specific surface area of the powder particle is less than 3 m²/g, preferably less than 2 m²/g. If the particle diameter is too small with the specific surface area too large, the contact area between the electrolyte and the cathode material is too large, causing side reaction to increase and impacting the cycling life. If the particle diameter is too large with the specific surface area too small, the contact area between the electrolyte and the cathode material is too small, the electrolyte cannot sufficiently wet the cathode material, thereby increasing the resistance of the cathode material and reducing the reversible capacity of the cathode material. Generally, a tap density of the cathode material produced by the method of this invention is more than 2.1 g/cm³, preferably more than 2.3 g/cm³. High tap density can increase the energy density of the battery.

The present invention also provides a method of producing the cathode material for lithium ion secondary battery. The cathode material as produced by the method is in the form of powder particles, the powder particle includes a bulk portion and a coating portion coated on the outer surface of the bulk portion. The method includes the following steps:

(1) providing nickel salt, further providing cobalt salt and/or at least one other salt of metal selected from Mn, Na, K, Mg, Ca, Sr, Ba, Al, Ga, In, Ge, Sn, Ti, V, Cr, Fe, Cu, Zn, Y, Zr, Nb, Mo, Cd, W, La, Ce, Nd and Sm, dissolving in water to form a precursor solution of the bulk portion;

(2) providing manganese salt only, or providing manganese salt and at least one other salt of metal selected from Ni, Co, Na, K, Mg, Ca, Sr, Ba, Al, Ga, In, Ge, Sn, Ti, V, Cr, Fe, Cu, Zn, Y, Zr, Nb, Mo, Cd, W, La, Ce, Nd and Sm, dissolving in water to form a precursor solution of the coating portion;

(3) feeding the precursor solution of the bulk portion, an aqueous solution of ammonia and an aqueous solution of alkali into a reactor for reaction;

(4) when the bulk portions are formed in the reaction of step (3), stopping feeding the precursor solution of the bulk portion into the reactor, then feeding the precursor solution of the coating portion into the reactor for reaction with the aqueous solution of ammonia and the aqueous solution of alkali to form a precursor nickel complex compound of the cathode material, the precursor nickel complex compound being represented as $[(Ni_{1-x-y}Co_xM_y)_{1-z}(Mn_{2-a}M'_a)_z](OH)_2$ or $[(Ni_{1-x-y}Co_xM_y)_{1-z}(Mn_{0.5-b}M'_b)_z](OH)_2$ or $[(Ni_{1-x-y}Co_xM_y)_{1-z}(Mn_{2-a}M'_a)_z]CO_3$ or $[(Ni_{1-x-y}Co_xM_y)_{1-z}(Mn_{0.5-b}M'_b)_z]CO_3$, wherein 0≤x≤0.5, 0≤x+y≤0.5, 0≤a≤1, 0≤b≤0.25, 0<z≤0.2;

(5) filtering, washing and drying the precursor nickel complex compound to obtain a nickel complex hydroxide or a nickel complex carbonate, or heat-treating the precursor nickel compound to obtain a nickel complex oxide; and (6) providing a lithium source compound, dry mixing or wet mixing the lithium source compound with the nickel complex hydroxide or the nickel complex carbonate or the nickel complex oxide to form a mixture, and sintering the mixture in air or oxygen to form the powder particles of the cathode material.

The precursor solution of the bulk portion and the precursor solution of the coating portion each have a concentration range of 0.5~3 mol/L.

By using the second cathode material with no electrochemical activity or low discharging specific capacity at a charged voltage of 4.2V versus $Li/Li^+$ to protect the first cathode material with electrochemical activity and high discharging specific capacity at a charged voltage of 4.2V versus $Li/Li^+$, the present invention can obtain a high nickel cathode material with high capacity, good thermal stability and long cycling life. The second cathode material is preferably at least one lithium transition metal oxide with conduction channel for lithium ions and electrons, and can avoid the side effects such as the decrease of the capacity, the increase of the resistance, and the damage of the rate performance caused by coating. Meanwhile, with no electrochemical activity or low discharging specific capacity, the outer surface of the cathode material is always in inactive state and will not appear active sites of high electrochemical activity at the outer surface, thereby avoiding the reaction between the outer surface of the cathode material and the electrolyte, to protect the inner first cathode material from reacting with the electrolyte by a physical isolation. By using the second cathode material with no electrochemical activity or very low discharging specific capacity when charged to 4.2V versus $Li/Li^+$ to protect the inner high nickel active material, the best modification effect can be achieved.

Conventionally, the coating method of the cathode material is introducing the coating material after the cathode material is sintered, and then forming the coating layer at the outer surface of the powder particle to achieve the modification of the cathode material. For planar-type high nickel material, the intercalation and deintercalation of lithium ions is very fast, there are many limitations for coating. For example, if the coating method is carried in water, the lithium ions may be pulled out from the particle and enter into the water, resulting in the omission of the lithium ions. Another example, if the coating method is carried by gas phase coating, the lithium ions may accumulate on the outer surface of the particle, resulting a deficiency of lithium ions inside the particle. During the experiments of modification of high nickel material, the researchers find many cases in which damages of the material are caused by the coating. In the high nickel cathode material produced by the present invention, the inner bulk portion is active with high nickel material, while the outer coating portion is inert with high manganese material. In the method of producing the cathode material, the inner high nickel bulk portion and the outer high manganese coating portion are formed and constructed during the precursor forming processes. Thereafter, the lithium source compound is introduced to mix with the precursor nickel complex compound, and the mixture is sintered to finally form the powder particles of the cathode material with an excellent electrochemical performance, wherein the powder particle has a bulk portion of a lithium-nickel based composite oxide and a coating portion of a lithium transition metal oxide coated on the bulk portion.

In an embodiment, in step (6), the mixture includes a non-metal salt; dry mixing or wet mixing the lithium source compound, the non-metal salt with the nickel complex hydroxide or the nickel complex carbonate or the nickel complex oxide to form a mixture; the non-metal is F or S.

In an embodiment, the salts that form the precursor solution of the bulk portion and the precursor solution of the coating portion in step (1) and step (2) are at least one selected from nitrate, sulfate, acetate, phosphate and halide, and sulfate is preferable for cost saving. The phosphate includes hydrogen phosphate and dihydrogen phosphate. By adjusting the composition of the precursor solution of the coating portion, different coating layers can be formed.

In an embodiment, the aqueous solution of ammonia is formed by mixing at least one of ammonia, ammonium hydroxide, ammonium carbonate, ammonium bicarbonate, and ammonium sulfate with water. In general, the aqueous solution of ammonia has a concentration of 0.1~1 mol/L.

In an embodiment, the lithium source compound is selected from at least one of hydroxide of lithium, oxyhydroxide of lithium, oxide of lithium, sulfide of lithium, carbonate of lithium, nitrate of lithium, acetate of lithium, and halide of lithium. The aqueous solution of alkali is formed by mixing at least one of sodium hydroxide, potassium hydroxide, sodium carbonate, and sodium bicarbonate with water. Preferably, the alkali in the aqueous solution of alkali is sodium hydroxide or potassium hydroxide. In general, the aqueous solution of alkali has a concentration of 0.5~5 mol/L.

In an embodiment, in step (3) and step (4), the pH value of the reaction is controlled in the range of 9~12.5, the temperature of the reaction is controlled in the range of 30~80° C., and the stirring speed of the reaction is controlled in the range of 100~2000 rpm. The stirring is started simultaneously when the precursor solution of the bulk portion, the aqueous solution of ammonia and the aqueous solution of alkali are fed into the reactor. In the earlier core formation stage of the bulk portion, the pH value of the reaction is adjusted relatively higher, while in the later particle growth stage, the pH value of the reaction is adjusted relatively lower. During the reaction in forming the core reaction, the reaction temperature is preferably controlled at about 50° C., and the time is preferably controlled from 1 to 24 hours, more preferably from 6 to 12 hours for taking into account of the production efficiency and the performance of the material. The reaction for forming the bulk portion is preferably protected by inert gas to avoid oxidation of the core metal elements and influence of the tap density of the cathode material. The conditions for reaction to form the coating portion are basically the same as the conditions to form the bulk portion, except that the reaction time to form the coating reaction is generally 0.5 to 6 hours, the longer the time is, the thicker the coating layer becomes.

If the aqueous solution of ammonia or the aqueous solution of alkali is an aqueous solution of hydroxide, the precursor nickel complex compound obtained will be a nickel complex hydroxide, which can be roughly expressed as $[(Ni_{1-x-y}Co_xM_y)_{1-z}(Mn_{2-a}M'_a)_z](OH)_2$ or $[(Ni_{1-x-y}Co_xM_y)_{1-z}(Mn_{0.5-b}M'_b)_z](OH)_2$, wherein $0 \leq x \leq 0.5$, $0 \leq x+y \leq 0.5$, $0 \leq a \leq 1$, $0 \leq b \leq 0.25$, $0 < z \leq 0.2$. If the aqueous solution of ammonia is an aqueous solution of ammonium carbonate or the aqueous solution of alkali is an aqueous solution of sodium carbonate, the precursor nickel complex compound obtained will be a nickel complex carbonate, which can be roughly expressed as $[(Ni_{1-x-y}Co_xM_y)_{1-z}(Mn_{2-a}M'_a)_z]CO_3$ or $[(Ni_{1-x-y}Co_xM_y)_{1-z}(Mn_{0.5-b}M'_b)_z]CO_3$, wherein $0 \leq x \leq 0.5$, $0 \leq x+y \leq 0.5$, $0 \leq a \leq 1$, $0 \leq b \leq 0.25$, $0 < z \leq 0.2$. Taking the precursor nickel complex compound is $[(Ni_{1-x-y}Co_xM_y)_{1-z}(Mn_{2-a}M'_a)_z](OH)_2$ as an example, it means the material of the bulk portion is $(Ni_{1-x-y}Co_xM_y)_{1-z}(OH)_{2-2z}$, and the material of the coating portion is $(Mn_{2-a}M'_a)_z](OH)_{2z}$. In order to ensure high capacity of the cathode material, the outer coating portion cannot be too thick, a thickness of just covering the surface of the bulk portion being OK. Generally, after being sintered into the cathode material, the coating amount of the inert outer second cathode material (i.e., the coating portion) is less than 10% of the whole particle in weight, preferably less than 5%. However, the amount of the second cathode material cannot be too small, if less than 1%, it may not completely cover the outer surface of the bulk portion of the particle, and cannot effectively protect the bulk portion formed of an active material.

In step (5), the precursor nickel complex compound is filtered, washed and dried, or heat-treated to a nickel complex oxide. By heat-treating, water or $CO_2$ in the precursor nickel complex compound is removed. The temperature of heat treatment is preferably 500~900° C., the time of heat treatment is preferably from 2~6 hours.

In step (6), the nickel complex hydroxide, the nickel complex carbonate, the nickel complex oxide and the lithium source compound are weighed before they are mixed. Then, the lithium source compound is dry mixed or wet mixed with the nickel complex hydroxide or the nickel complex carbonate or the nickel complex oxide. According to different selections of the aqueous solution of ammonia and/or the aqueous solution of alkali, the precursor nickel complex compound obtained can be a nickel complex hydroxide or a nickel complex carbonate. If the precursor nickel complex compound obtained is further heat treated, it becomes to a nickel complex oxide. Therefore, the lithium source compound is mixed with the nickel complex hydroxide, or the nickel complex carbonate, or the nickel complex oxide depending on the selections of the aqueous solution of ammonia and/or the aqueous solution of alkali or whether the precursor nickel complex compound obtained is heat treated or not. The mixture is then sintered in an atmosphere with oxygen to obtain the powder particles of the cathode material, the powder particle has a bulk portion made of a lithium-nickel based composite oxide and a coating portion coated on the outer surface of the bulk portion. The lithium source compound may be at least one of lithium hydroxide (including lithium hydroxide with crystallization water), lithium carbonate, lithium nitrate, lithium acetate and lithium fluoride, with lithium hydroxide being preferred. In mixing, the molar ratio of the precursor nickel complex compound to the lithium source compound is in the range of 1:1.1 to 1:0.95, preferably 1:1.06 to 1:1, and particularly preferably 1:1.03 to 1:1.

In an embodiment, in step (6), the mixture is sintered firstly at 400~800° C. for 1 to 30 hours, and then sintered at 700~900° C. for 1 to 30 hours. In sintering, the oxygen content in the atmosphere with oxygen is more than 30%. Preferably, the mixture is sintered firstly at 400~800° C. for 1 to 30 hours and then sintered at 700~900° C. for 2 to 20 hours. Since the lithium hydroxide has a melting point lower than 500° C., pre-sintering the mixture firstly helps the lithium hydroxide to melt into liquid state to contact with the precursor nickel complex compound completely to cause them to react with each other fully in the following sintering process.

In an embodiment, in step (6), after the materials are sintered to form the powder particles of the cathode material, a washing step is added to wash the sintered product. After washing, the sintered product is dried at 150~350° C. in vacuum or at an atmosphere without carbon and sulfur for 1 to 30 hours. The washing step is used for removing excessive lithium hydroxide after the precursor nickel complex compound and the lithium source compound are sintered to form the powder particles of the cathode material. During the washing step, the water temperature is 0~40° C., preferably 10~30° C. If the water temperature is too high, it may promote the lithium ions to pull out from the powder particles, thus leading to decrease of performance of the cathode material. If the water temperature is too low, the solubility of the lithium hydroxide in water is too small, it may result in the removal of the lithium hydroxide from the powder particles being ineffective. Also, in the washing step, water consumption should be controlled, if too much water is used, it will not only produce large amounts of waste water, but also cause the elution of the lithium ions from the powder particles; if too little water is used, the removal of the lithium hydroxide is not effective. Generally, in washing of the powder particles of the cathode material, the solid content is preferably 500~2000 g/L, with 1000~1500 g/L being preferred. After the washing, the powder particles are dried in vacuum condition, the drying temperature is 100~350° C., preferably 150~250° C., and the drying time is 1 to 30 hours, preferably 2 to 30 hours, more preferably 5 to 24 hours.

In an embodiment, an outer surface of the coating portion of the particle is further dot coated or surface coated with at least one Lewis base in order to remove HF at the interface between the cathode material and the electrolyte.

In an embodiment, the dot coating or surface coating is heat-treating the Lewis base and the cathode material after they are mechanically mixed. The Lewis base is in nanometer size.

In an embodiment, the Lewis base is produced from a metal alkyl oxide. The Lewis base may be produced in any conventional manners from the metal alkyl oxide, for example, the Lewis base is produced by hydrolysis of the metal alkyl oxide.

In an embodiment, the metal alkyl oxide is selected from at least one of aluminum isopropoxide, titanium isopropoxide, tetra-n-butyl titanate, zirconium isopropoxide, ethoxy magnesium, and ethoxy calcium.

For optimizing the cathode material, after the coating portion is formed, various methods can be used for modifying the cathode material. One of them is the coating of a Lewis base on the outer surface of the coating portion of the powder particle by a variety of methods, including solid mixing method and liquid chelate method. For example, nano-sized Lewis base and the cathode material are mixed and heat treated to coat at least one Lewis base on the outer surface of the coating portion. In another example, the outer surface of the coating portion is coated with at least one Lewis base through a method of a chemical reaction of the metal alkyl oxide with the hydroxyl group of the cathode material. The metal alkyl oxide may be selected from at least one of aluminum isopropoxide, titanium isopropoxide, tetra-n-butyl titanate, zirconium isopropoxide, ethoxy magnesium or ethoxy calcium.

The present invention also provides a positive electrode of a lithium ion secondary battery, wherein the positive electrode includes a positive active material made from the above described cathode material for lithium ion secondary battery. For example, the positive electrode using the cathode material of the present invention can be roughly made by the following steps:

(1) mixing step: the powder particles of the above mentioned cathode material are mixed with a conductive material and a binder in solvents to form a slurry. The ratio of materials in the slurry determines the electrochemical property of the positive electrode being made. If the solid materials of the slurry is 100% in weight, in a specific example, the weight of the powder particles accounts for 80~95%, the weight of the conductive material accounts for 2~15%, and the weight of the binder accounts for 1~20%.

(2) coating step: the slurry is coated on a surface of an aluminum current collector of the positive electrode. Particularly, the slurry is uniformly and evenly coated on the current collector by a coating machine with a predefined thickness.

(3) drying step: after the slurry is coated on the current collector, the slurry is dried to volatile the solvents, to thereby form a positive active material with a suitable thickness on the surface of the current collector of the positive electrode.

The present invention further provides a lithium ion secondary battery, wherein the lithium ion secondary battery includes a positive electrode. The positive electrode includes a positive active material made from the cathode material described above. Except for the positive electrode using the cathode material of the present invention, other structures of the lithium ion secondary battery can be the same as the prior art. For example, the lithium ion secondary battery further includes a negative electrode, a separator, and an electrolyte. The structures of the lithium ion secondary battery are well known to one skilled in the art and thus are omitted herein.

The lithium ion secondary battery of the present invention using the high nickel cathode material, as compared with the prior art, has the following advantages: (1) as compared with other common coating materials, the second cathode material of the present invention has lithium ion migration channels and electron conduction ability, and does not result in a variety of defects due to coating; (2) the first cathode material of the bulk portion is active and provides the electrochemical capacity, the second cathode material of the coating portion is inert and does not introduce any active sites, side reaction does not occur between the coating layer and the electrolyte; (3) the coating layer can completely cover the bulk portion and can effectively isolate the active material of the bulk portion from the electrolyte to achieve maximal protection for the active material.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Example 1

For forming the precursor solution of the bulk portion in step (1), nickel sulfate, cobalt sulfate and aluminum sulfate are provided in a molar ratio of 82:15:3 as the source materials (salts), and the salts are dissolved in water to form the precursor solution with a concentration of 2 mol/L. The precursor solution of the bulk portion is used for forming the bulk portions of the powder particles of the cathode material.

For forming the precursor solution of the coating portion in step (2), manganese sulfate and nickel sulfate are provided in a molar ratio of 3:1 as the source materials (salts), and the salts are dissolved in water to form the precursor solution with a concentration of 2 mol/L. The precursor solution of the coating portion is used for forming the coating portions of the powder particles of the cathode material.

For forming the bulk portions of the powder particles in step (3) and step (4), nitrogen ($N_2$) is firstly fed into the reactor to cause the whole reaction is carried out in an atmosphere of nitrogen. Then, the precursor solution previously formed for forming the bulk portions of the powder particles, an aqueous solution of ammonia and an aqueous solution of alkali are fed into the reactor for reaction, and simultaneously the reaction is stirred at a stirring speed of 800 rpm. The precursor solution of the bulk portion is fed into the reactor at a speed of 200 mL/h. The aqueous solution of ammonia has a concentration of 0.2 mol/L and is fed into the reactor at a speed of 50 mL/h. The aqueous solution of alkali is an aqueous solution of sodium hydroxide with a concentration of 4 mol/L. During the reaction, the pH value is controlled in the range of 10~12. In the earlier core formation stage, the pH value is adjusted relatively higher, and in the later particle growth stage, the pH value is adjusted relatively lower. During the reaction, the temperature for reaction is about 50° C., the time for reaction is about 12 hours.

After the bulk portions are formed, the precursor solution of the bulk portion is stopped feeding into the reactor, and then, the precursor solution of coating portion previously formed for forming the coating portions of the powder particles is fed into the reactor to react with the aqueous solution of ammonia and the aqueous solution of alkali to form the coating portions respectively on the outer surfaces of the bulk portions. To ensure a uniform and dense coating, the feeding speed of the precursor solution of the coating portion and the aqueous solution of ammonia is slowed down, and the feeding speed of the aqueous solution of alkali is adjusted according to the desired pH value of the reaction. The coating process lasts for about 4 hours. The coating layer of the coating portion accounts for 2% of the whole powder particle in mole. After reaction, a precursor nickel complex hydroxide used for forming the cathode material is obtained, and the precursor nickel complex hydroxide is represented as $[(Ni_{0.82}Co_{0.15}Al_{0.03})_{0.98}(Mn_{1.5}Ni_{0.5})_{0.02}](OH)_2$.

The obtained precursor nickel complex hydroxide is filtered, washed and dried at 120° C. Then, the precursor nickel complex hydroxide is heat-treated at 900° C. for 4 hours to be transformed into a nickel complex oxide.

The obtained nickel complex oxide is dry mixed with lithium hydroxide in a molar ratio of 1:1.03 to form a mixture. The mixture is then transferred to a tube oven for sintering in an atmosphere with oxygen. In the tube oven, the mixture is pre-sintered at 500° C. for 4 hours and then sintered at 765° C. for 20 hours. The sintered product is then cooled down to room temperature. After cooling down, the sintered product is taken out of the tube oven. Then, the sintered product is crushed into powder particles to obtain the cathode material.

The obtained powder particles are added into distilled water at room temperature to form a slurry with a concentration of 1000 g/L. The slurry is stirred for 50 minutes at room temperature. Thereafter, the slurry is filtered and washed. The powder particles after being washed are transferred to a vacuum drying oven to dry at 150° C. for 15 hours to finally obtain a nickel-rich cathode material in the form of powder particles. The powder particles of the cathode material have physical properties as listed in Table 1. Table 1 shows the various properties of the cathode material produced according to the procedures described in Example 1.

Example 2

The same procedures as in Example 1 are conducted, with the exception that only manganese sulfate is provided as the source material for forming the precursor solution of the coating portion. The manganese sulfate is dissolved in water to form the precursor solution with a concentration of 2 mol/L. However, in Example 1, manganese sulfate and nickel sulfate are provided as the source materials for forming the precursor solution of the coating portion.

Example 3

The same procedures as in Example 1 are conducted, with the exception that the coating reaction takes about 1 hours (instead of 4 hours in Example 1) to coat the coating portions respectively on the outer surfaces of the bulk portions, and the coating layer of the coating portion accounts for 0.5% (instead of 2% in Example 1) of the whole powder particle in mole.

Example 4

The same procedures as in Example 2 are conducted, with the exception that the coating reaction takes about 6 hours (instead of 4 hours in Example 2 and Example 1) to coat the coating portions respectively on the outer surfaces of the bulk portions, and the coating layer of the coating portion accounts for 0.5% (instead of 2% in Example 2 and Example 1) of the whole powder particle in mole.

Example 5

The same procedures as in Example 1 are conducted, with the exception that before sintering, the nickel complex oxide is mixed with the lithium hydroxide in a molar ratio of 1:1.06, instead of 1:1.03.

Example 6

The same procedures as in Example 2 are conducted, with the exception that before sintering, the nickel complex oxide is dry mixed with the lithium hydroxide and $NH_4F$ in a molar ratio of 1:1.03:1.02, such that the power particles sintered and finally obtained are fluorine doped.

Example 7

The same procedures as in Example 2 are conducted, with the exception that nickel sulfate, cobalt sulfate, aluminum sulfate and magnesium nitrate are provided in a molar ratio of 80:15:3:2 as the source materials for forming the precursor solution of the bulk portion, and these materials are dissolved in water to form the precursor solution with a concentration of 2 mol/L, which is used for forming the bulk portions of the powder particles of the cathode material.

Example 8

The same procedures as in Example 1 are conducted, with the exception that manganese sulfate and zirconium nitrate are provided in a molar ratio of 0.95:0.05 as the source materials for forming the precursor solution of the coating portion, and these salts are dissolved in water to form the precursor solution with a concentration of 2 mol/L, which is used for forming the coating portions of the powder particles of the cathode material.

Example 9

The same procedures as in Example 2 are conducted, with the exception that after the mixture is sintered into the powder particles of the cathode material, another step is added to mix the powder particles with a nano-sized $Al_2O_3$ having an average diameter of 30 nm in a molar ratio of 1:0.01, to obtain a stabilized nickel-rich cathode material coated on the outer surface of the coating portion with a Lewis base.

Example 10

The same procedures as in Example 2 are conducted, with the exception that before sintering, the nickel complex oxide is mixed with the lithium hydroxide in a molar ratio of 1:1.00, instead of 1:1.03.

Example 11

The same procedures as in Example 1 are conducted, with the exception that the precursor solution of the coating portion is fed into the reactor at twice. Specifically, after the bulk portions are formed, the precursor solution of the bulk portion is stopped feeding into the reactor, and then, a precursor solution formed by mixing manganese sulfate and nickel sulfate in a molar ratio of 3:1 and dissolved in water with a concentration of 2 mol/L is firstly fed into the reactor to coat a first coating layer on the bulk portion, wherein the first coating layer accounts for 1% of the whole powder particle in mole. After the first coating layer is formed, a precursor solution formed by dissolving manganese sulfate only in water with a concentration of 2 mol/L is then fed into the reactor to coat a second coating layer further on the first coating layer, wherein the second coating layer accounts for 1% of the whole powder particle in mole. The whole coating reaction to form the first coating layer and the second coating layer lasts for about 4 hours.

Example 12

The same procedures as in Example 2 are conducted, with the exception that the mixture formed by mixing the nickel complex oxide with the lithium hydroxide is pre-sintered at 500° C. for 4 hours and then sintered at 820° C. for 6 hours to form the cathode material.

Example 13

The same procedures as in Example 2 are conducted, with the exception that the mixture formed by mixing the nickel complex oxide with the lithium hydroxide is pre-sintered at 500° C. for 4 hours and then sintered at 700° C. for 30 hours to form the cathode material.

Comparative Example 1

Nickel sulfate, cobalt sulfate and aluminum sulfate are provided in a molar ratio of 82:15:3 and dissolved in water to form a precursor solution with a concentration of 2 mol/L. Nitrogen ($N_2$) is firstly fed into the reactor to cause the whole reaction is carried out in an atmosphere of nitrogen. The precursor solution previously formed, an aqueous solution of ammonia and an aqueous solution of alkali are then fed into the reactor for reaction at a stirring speed of 800 rpm. The precursor solution is fed into the reactor at a speed of 200 mL/h. The aqueous solution of ammonia has a concentration of 0.2 mol/L and is fed into the reactor at a speed of 50 mL/h. The aqueous solution of alkali is an aqueous solution of sodium hydroxide with a concentration of 4 mol/L. During the reaction, the pH value is controlled in the range of 10~12. In the earlier core formation stage, the pH value is adjusted relatively higher, and in the later particle growth stage, the pH value is adjusted relatively lower. During the reaction, the temperature for reaction is about 50° C., the time for reaction is about 12 hours. After the reaction, a precursor nickel complex hydroxide used for forming the cathode material is obtained.

The obtained precursor nickel complex hydroxide is filtered, washed and dried at 120° C. Then, the precursor nickel complex hydroxide is heat-treated at 900° C. for 4 hours to be transformed into a nickel complex oxide.

The obtained nickel complex oxide is dry mixed with lithium hydroxide in a molar ratio of 1:1.03 to form a mixture. The mixture is transferred to a tube oven for sintering in an atmosphere with oxygen. In the tube oven, the mixture is pre-sintered at 500° C. for 4 hours and then sintered at 765° C. for 20 hours. The sintered product is then cooled down to room temperature. After cooling down, the sintered product is taken out of the tube oven. Then, the sintered product is crushed into powder particles.

The obtained powder particles are added into distilled water at room temperature to form a slurry with a concentration of 1000 g/L. The slurry is stirred for 50 minutes at room temperature. Thereafter, the slurry is filtered and washed. The powder particles after being washed are transferred to a vacuum drying oven to dry at 150° C. for 15 hours to finally obtain a cathode material in the form of powder particles. The powder particles of the cathode material have physical properties as listed in Table 2. Table 2 shows the various properties of the cathode material produced according to the procedures described in Comparative Example 1.

Table 1 and Table 2 show that the nickel-rich cathode material produced according to the procedures described in Example 1 has the similar particle size distribution as the cathode material produced according to the procedures described in Comparative Example 1. The nickel-rich cathode material showed in Table 1 is coated on the bulk portion with a layer of inert material (i.e., a coating layer) which is electrochemically inactive or has low discharging specific capacity when charged to 4.2V versus Li/Li$^+$. However, the cathode material showed in Table 2 is not coated with a coating layer on the bulk portion. Both of the cathode materials have almost the same average particle diameter and tap density (TD). The water content ($H_2O$) of the cathode material showed in Table 1 is lower than the cathode material showed in Table 2, the reason may be that the inert coating layer has a stronger hydrophobic property than the bulk portion of the particle, thus reducing the ability of the cathode material showed in Table 1 to absorb water. The pH value of the cathode material showed in Table 1 is also lower than the cathode material showed in Table 2, because the inert coating layer has an alkaline weaker than the bulk portion of the particle. The specific surface area of the both materials (BET) is 0.65 m$^2$/g and 0.87 m$^2$/g, respectively.

Figure 1:
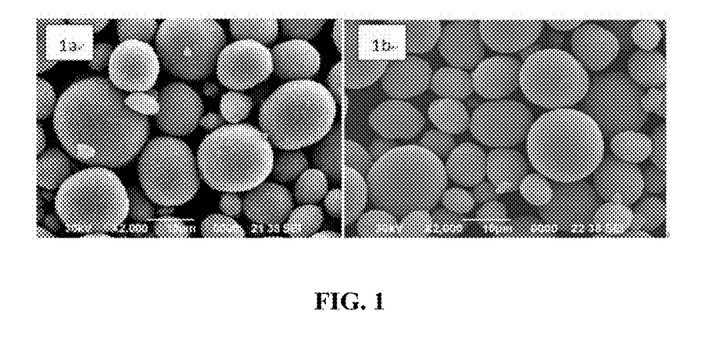
FIG. 1 are SEM photographs of the nickel complex hydroxides produced according to Example 1 (FIG. 1a) and Comparative Example 1 (FIG. 1b).
Figure 2:
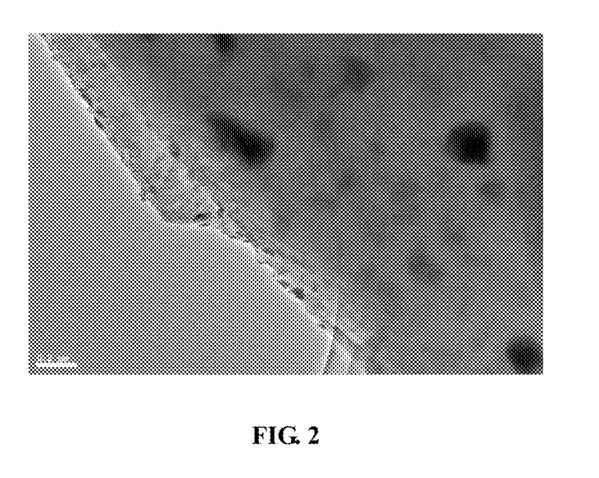
FIG. 2 is a TEM photograph of the nickel complex hydroxide produced according to Example 1.

The SEM micrographs in FIG. 1 and the TEM micrograph in FIG. 2 show that a uniform and dense coating surface can be obtained by the method of Example 1 to produce the precursor nickel complex hydroxide for forming the cathode material.

Figure 3:
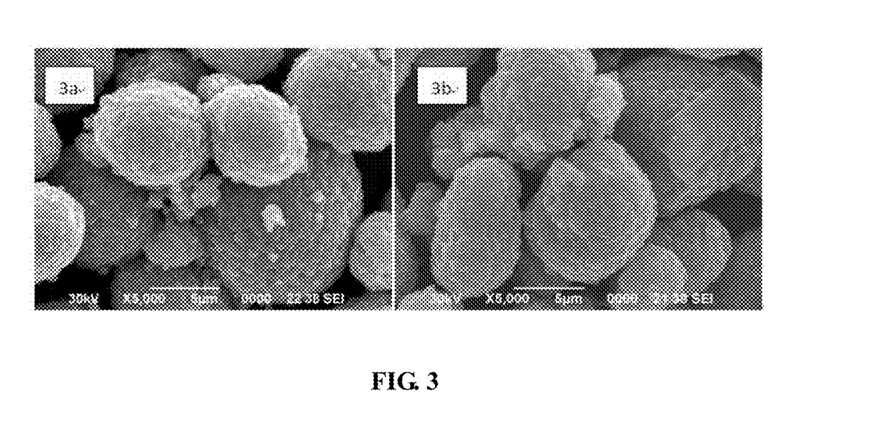
FIG. 3 are SEM photographs of the cathode materials produced according to Example 1 (FIG. 3a) and Comparative Example 1 (FIG. 3b).
Figure 4:
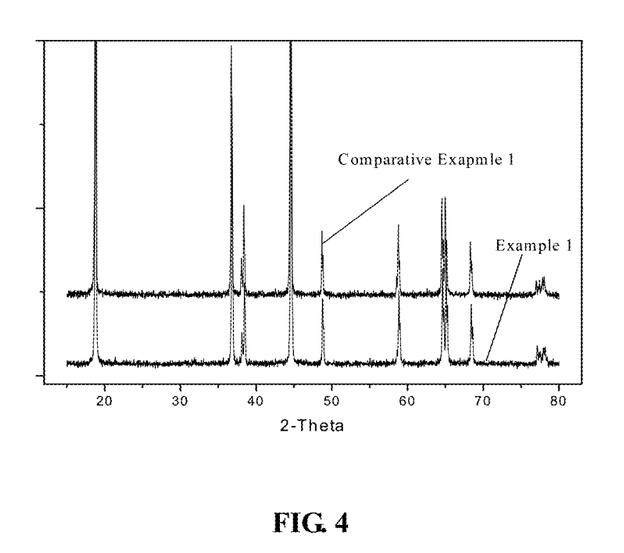
FIG. 4 shows XRD analysis of the cathode materials produced according to Example 1 and Comparative Example 1.

The SEM micrographs in FIG. 3 and the XRD analysis in FIG. 4 show that the cathode material produced according to Example 1 has a crystalline structure with a required outer shape. The coating reaction does not affect the outer shape of the powder particles obtained.

Figure 5:
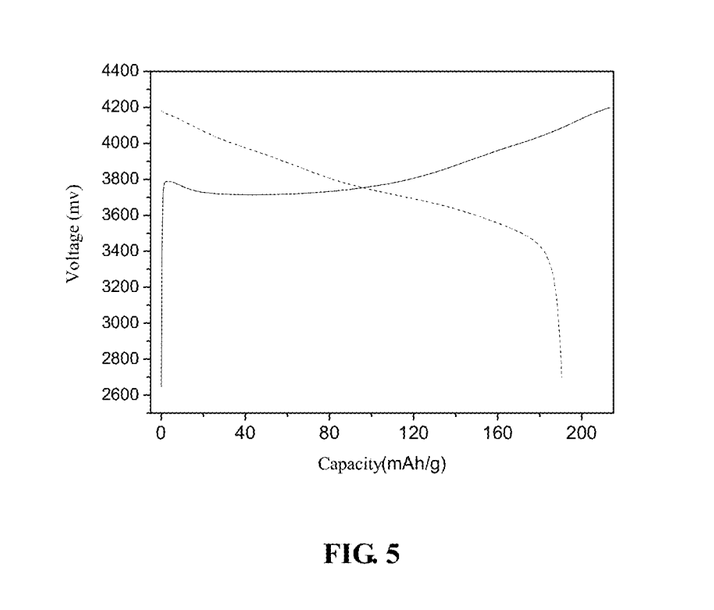
FIG. 5 is a graph showing the initial charge and discharge curves of the cathode material produced according to Example 8.

It can be seen from FIG. 5 that the cathode material produced according to Example 8 has high initial discharge capacity and high initial discharge efficiency.

For evaluation, a coin type battery using the cathode material according to the present invention is produced as follows. Firstly, the powder particles of the cathode material produced from each of the above Examples are mixed with acetylene black (a conductive material) and polyvinylidene difluoride (PVDF) (a binder) in weight ratio of 80:10:10, and a solvent of 1-methyl-2-pyrrolidinone is added to form a slurry. The slurry is uniformly coated on an aluminum foil having a thickness of 20 μm. The slurry then is dried at 120° C. in a vacuum. The coated aluminum foil is then punched to form a coin plate with a diameter of 14 mm as the positive electrode. A lithium metal film is used as the negative electrode. A porous polyethylene film having a thickness of 25 μm is used as the separator. A mixture solution of dimethyl carbonate (DMC), ethylene carbonate, and diethyl carbonate in volume ratio 1:1:1 is used as the electrolyte in which LiPF$_6$ is added. The positive electrode, the negative electrode, the separator, the electrolyte and other related elements are assembled in a glove box at an atmosphere with Ar gas to form the coin battery.

The characteristics (including initial discharge capacity, initial discharge efficiency, and capacity retention rate) of the cathode material of the coin type batteries are listed in Table 3.

Initial discharge capacity: The coin type battery produced is laid aside for 24 hours. After an open circuit voltage (OCV) was stabilized, the battery is charged to 4.2V with a current density for the positive electrode being set at 0.1 mA/cm$^2$. After the battery is laid aside for 10 minutes, the battery is discharged to 3.0V, the capacity being discharged is defined as initial discharge capacity, and the ratio of the initial discharge capacity to the initial charge capacity is defined as initial discharge efficiency.

Capacity retention rate at room temperature: At room temperature, the battery is charged to 4.2V with a current density for the positive electrode being set at 0.5 mA/cm$^2$, and then the battery is discharged to 3.0V as a cycle. The test is repeated for 100 cycles with a 10-minutes break between every two cycles. The ratio of the discharge capacity after the test to the initial discharge capacity is defined as capacity retention rate at room temperature. Considering the test error, three batteries are tested, and an average value of the capacity retention rate of the three batteries is adopted as the capacity retention rate at room temperature.

Capacity retention rate at 45° C.: The battery is disposed in a baking oven with a temperature of 45° C. The battery is charged to 4.2V with a current density for the positive electrode being set at 0.5 mA/cm$^2$, and then the battery is discharged to 3.0V as a cycle. The test is repeated for 50 cycles with a 10-minutes break between every two cycles. The ratio of the discharge capacity after the test to the initial discharge capacity is defined as capacity retention rate at 45° C. Considering the test error, three batteries are tested, and an average value of the capacity retention rate of the three batteries is adopted as the capacity retention rate at 45° C.

Table 3 shows the test results of batteries with a positive electrode using the cathode material produced according to each Example of the present invention, compared with a comparative battery with a positive electrode using the cathode material produced according to Comparative Example 1. In the Examples of the present invention, the bulk portion of the powder particle of the cathode material is coated with a coating layer which is electrochemically inactive or has low discharging specific capacity when charged to 4.2V versus Li/Li$^+$, in order to stabilize the battery with less capacity loss, as shown from the significant improvement in the capacity retention rate at room temperature and the capacity retention rate at 45° C. When an outer surface of the particle is further coated with a nano-sized Lewis base material, the cycling stability is further improved (Example 9). When the second cathode material of the coating portion is further doped by a non-metal element such as fluorine (Example 6) or a metal element such as Zr (Example 8), or the first cathode material of the bulk portion is further doped by a metal element such as Mg (Example 7), enhanced capacity retention rate is also shown.

As can be seen from Table 3, (1) the use of appropriate coating can keep the high-capacity characteristics of the cathode material, the coating amount is better to be controlled less than 5% of the whole particle in weight; (2) compared to high nickel cathode material without surface coating, the high nickel cathode material with surface coating of inert second cathode material has better cycling stability, especially the obvious improvement regarding capacity retention at high temperature. (3) After the coating treatment by adding Lewis base such as nano-sized Al$_2$O$_3$, the cycling stability is further increased; (4) doping with other metal elements and non-metallic elements in the first cathode material and the second cathode material can also improve the cycling stability of the cathode material; (5) during the producing of the cathode material, controlling to the process conditions is important, the amount of the lithium source compound being added, sintering temperature, sintering time, etc., can have significant impact on the performance of the cathode material being produced.

TABLE 1

The various properties of the cathode material produced according to the procedures described in Example 1

| Item | Result | Measurement (method & equipment) |
|---|---|---|
| H$_2$O | <300 ppm | Refer to the standard GB/T 606-2003, measured by a Carle Fischer coulometric instrument |
| particle size distribution (μm) | | |
| D$_{(10)}$ | 7.8 | Refer to the standard GB/T 19077.1-2008, measured by a laser diffraction scattering type particle size distribution measurement apparatus (Mastersizer2000) |
| D$_{(50)}$ | 15.5 | |
| D$_{(90)}$ | 25.0 | |
| BET (m$^2$/g) | 0.65 | Refer to the standard GBT13390-2008, measured by a specific surface area analyzer QUADRASORBSI |
| TD (g/cm$^3$) | 2.4 | Refer to the standard GB/T5162-2006/ISO3935:1993, measured by a tap density tester Model FZS4-4B |
| pH | 11.5 | Refer to the standard GB/T1717-1986, measured by a pH meter DELTA320 |

TABLE 2

The various properties of the cathode material produced according to the procedures described in Comparative Example 1

| Item | Result | Measurement (method & equipment) |
|---|---|---|
| $H_2O$ | 472 ppm | Refer to the standard GB/T 606-2003, measured by a Carle Fischer coulometric instrument |
| | | particle size distribution (μm) |
| $D_{(10)}$ | 7.8 | Refer to the standard GB/T 19077.1-2008, measured by a laser diffraction scattering type particle size distribution measurement apparatus (Mastersizer2000) |
| $D_{(50)}$ | 15.0 | |
| $D_{(90)}$ | 24.3 | |
| BET ($m^2$/g) | 0.87 | Refer to the standard GBT13390-2008, measured by a specific surface area analyzer QUADRASORBSI |
| TD (g/$cm^3$) | 2.4 | Refer to the standard GB/T5162-2006/ISO3935:1993, measured by a tap density tester Model FZS4-4B |
| pH | 11.8 | Refer to the standard GB/T1717-1986, measured by a pH meter DELTA320 |

TABLE 3

The evaluation of characteristics of the coin type batteries using the cathode material produced by each Example and Comparative Example

| Example | Bulk portion | Coating portion | Sintering temperature | Amount of coating | Initial discharge capacity (mAh/g) | Initial discharge efficiency | Capacity retention rate at room temperature | Capacity retention rate at 45° C. |
|---|---|---|---|---|---|---|---|---|
| Example 1 | $Li_{1.03}Ni_{0.82}Co_{0.15}Al_{0.03}O_2$ | $Li_{1.03}Ni_{0.5}Mn_{1.5}O_4$ | 765° C. | 2% | 187 | 89.0 | 95% | 86% |
| Example 2 | $Li_{1.03}Ni_{0.82}Co_{0.15}Al_{0.03}O_2$ | $Li_{2.06}MnO_3$ | 765° C. | 2% | 186 | 88.9 | 96% | 87% |
| Example 3 | $Li_{1.03}Ni_{0.82}Co_{0.15}Al_{0.03}O_2$ | $Li_{1.03}Ni_{0.5}Mn_{1.5}O_4$ | 765° C. | 0.5% | 188 | 88.5 | 93% | 82% |
| Example 4 | $Li_{1.03}Ni_{0.82}Co_{0.15}Al_{0.03}O_2$ | $Li_{2.06}MnO_3$ | 765° C. | 5% | 178 | 87.6 | 94% | 88% |
| Example 5 | $Li_{1.06}Ni_{0.82}Co_{0.15}Al_{0.03}O_2$ | $Li_{1.06}Ni_{0.5}Mn_{1.5}O_4$ | 765° C. | 2% | 182 | 87.9 | 95% | 85% |
| Example 6 | $Li_{1.03}Ni_{0.82}Co_{0.15}Al_{0.03}O_{1.98}F_{0.02}$ | $Li_{2.06}MnO_{2.98}F_{0.02}$ | 765° C. | 2% | 176 | 87.0 | 96% | 88% |
| Example 7 | $Li_{1.03}Ni_{0.80}Co_{0.15}Al_{0.03}Mg_{0.02}O_2$ | $Li_{2.06}MnO_3$ | 765° C. | 2% | 180 | 87.8 | 95% | 87% |
| Example 8 | $Li_{1.03}Ni_{0.82}Co_{0.15}Al_{0.03}O_2$ | $Li_{2.06}Mn_{0.95}Zr_{0.05}O_3$ | 765° C. | 2% | 187 | 88.7 | 96% | 88% |
| Example 9 | $Li_{1.03}Ni_{0.82}Co_{0.15}Al_{0.03}O_2$ | $Li_{2.06}MnO_3$ + $Al_2O_3$ | 765° C. | 3% | 183 | 88.5 | 96% | 89% |
| Example 10 | $Li_{1.00}Ni_{0.82}Co_{0.15}Al_{0.03}O_2$ | $Li_{2.00}MnO_3$ | 765° C. | 2% | 172 | 86.1 | 96% | 88% |
| Example 11 | $Li_{1.03}Ni_{0.82}Co_{0.15}Al_{0.03}O_2$ | $Li_{1.03}Ni_{0.5}Mn_{1.5}O_4$ + $Li_{2.06}MnO_3$ | 765° C. | 2% | 187 | 88.5 | 95% | 86% |
| Example 12 | $Li_{1.03}Ni_{0.82}Co_{0.15}Al_{0.03}O_2$ | $Li_{2.06}MnO_3$ | 820° C. | 2% | 169 | 85.1 | 91% | 84% |
| Example 13 | $Li_{1.03}Ni_{0.82}Co_{0.15}Al_{0.03}O_2$ | $Li_{2.06}MnO_3$ | 700° C. | 2% | 160 | 80.2 | 90% | 82% |
| Comparative Example 1 | $Li_{1.03}Ni_{0.82}Co_{0.15}Al_{0.03}O_2$ | None | 765° C. | 0 | 190 | 88.7 | 92% | 81% |

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cathode material for lithium ion secondary battery, wherein the cathode material is in the form of powder particles, the powder particle includes a bulk portion and a coating portion coated on the outer surface of the bulk portion, the bulk portion is formed of at least one first cathode material which is a lithium-nickel based composite oxide, the first cathode material has electrochemical activity and has high charging-discharging specific capacity at a charged voltage of 4.2V versus Li/Li+, the coating portion is formed of at least one second cathode material, the second cathode material has no electrochemical activity or has low charging-discharging specific capacity at a charged voltage of 4.2V versus Li/Li+, wherein the first cathode material has a general formula of $Li_{1+\delta}[Ni_{1-x-y}Co_xM_y]O_2$, wherein M is selected at least one metal element from Mn, Na, K, Mg, Ca, Sr, Ba, Al, Ga, In, Ge, Sn, Ti, V, Cr, Fe, Cu, Zn, Y, Zr, Nb, Mo, Cd, W, La, Ce, Nd and Sm, wherein $0<\delta<0.2$, $0<x<0.5$, $0<x+y<0.5$, and wherein the second cathode material has a general formula of $Li_{1+\eta}[Mn_{2-a}M'_a]O_4$, wherein M' is selected at least one metal element from Ni, Co, Na, K, Mg, C, Sr, Ba, A, Ga, In, Ge, Sn, Ti, V, Cr, Fe, Cu, Zn, Y, Zr, Nb, Mo, Cd, W, La, Ce, Nd and Sm, wherein $0<\eta<0.2$, $0<a<1$.

2. The cathode material for lithium ion secondary battery of claim 1, wherein the second cathode material is at least one of lithium transition metal oxides.

3. The cathode material for lithium ion secondary battery of claim 1, wherein in the first cathode material with the general formula of $Li_{1+\delta}[Ni_{1-x-y}Co_xM_y]O_2$, the valence of the metal element Ni and Co is +3, the valence of the metal element M is +2, +3, +4, +5, or +6.

4. The cathode material for lithium ion secondary battery of claim 1, wherein the weight of the coating portion accounts for 0.1~10% of the weight of the powder particle.

5. The cathode material for lithium ion secondary battery of claim 1, wherein an outer surface of the coating portion is dot coated or surface coated with at least one Lewis base.

6. The cathode material for lithium ion secondary battery of claim 5, wherein the Lewis base is selected from at least one of ZnO, $Al_2O_3$, MgO, CaO, $ZrO_2$, $TiO_2$, $SnO_2$ and $Sb_2O_5$.

7. The cathode material for lithium ion secondary battery of claim 5, wherein the weight of the Lewis base accounts for 0.1~5% of the weight of the powder particle.

8. The cathode material for lithium ion secondary battery of claim 1, wherein the powder particle is spherical or spheroidal, and the particle diameter is 0.5~50 μm.

9. A positive electrode of a lithium ion secondary battery, wherein the positive electrode is made of positive active material which includes the cathode material of claim 1.

10. A lithium ion secondary battery, wherein the lithium ion secondary battery includes a positive electrode, wherein the positive electrode is made of positive active material which includes the cathode material of claim 1.

* * * * *